(12) United States Patent
Madson et al.

(10) Patent No.: US 10,016,661 B2
(45) Date of Patent: Jul. 10, 2018

(54) METHODS FOR MAKING GOLF BALL COMPONENTS USING THREE-DIMENSIONAL ADDITIVE MANUFACTURING SYSTEMS

(71) Applicant: Acushnet Company, Fairhaven, MA (US)

(72) Inventors: Michael R. Madson, Easton, MA (US); Edmund A. Hebert, Mattapoisett, MA (US); Nicholas M. Nardacci, Barrington, RI (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/091,750

(22) Filed: Apr. 6, 2016

(65) Prior Publication Data

US 2017/0291077 A1     Oct. 12, 2017

(51) Int. Cl.
| | |
|---|---|
| *A63B 45/00* | (2006.01) |
| *A63B 37/00* | (2006.01) |
| *B29C 64/129* | (2017.01) |
| *B29C 64/124* | (2017.01) |
| *B29C 64/135* | (2017.01) |

(52) U.S. Cl.
CPC .......... *A63B 45/00* (2013.01); *A63B 37/0007* (2013.01); *A63B 37/0009* (2013.01); *A63B 37/0055* (2013.01); *A63B 37/0058* (2013.01); *A63B 37/0066* (2013.01); *A63B 37/0073* (2013.01); *A63B 37/0074* (2013.01); *A63B 37/0075* (2013.01); *A63B 37/0076* (2013.01); *B29C 64/124* (2017.08); *B29C 64/129* (2017.08); *B29C 64/135* (2017.08)

(58) Field of Classification Search
CPC ............ B29C 67/0062; B29C 67/0066; B29C 67/007; B29C 64/124; B29C 64/129; B29C 64/135
USPC ........................................................ 264/401
See application file for complete search history.

(56) References Cited

U.S. PATENT DOCUMENTS

| | | |
|---|---|---|
| 4,625,964 A | 12/1986 | Yamada |
| 5,048,838 A | 9/1991 | Chikaraishi et al. |
| (Continued) | | |

OTHER PUBLICATIONS

Tumbleston et al., "Continuous Liquid Interface Production Of 3D objects," Science, Mar. 20, 2015, vol. 347, No. 6228, pp. 1349-1352. www.sciencemag.org, published on-line, Mar. 16, 2015.

*Primary Examiner* — Leo B Tentoni
(74) *Attorney, Agent, or Firm* — Daniel W. Sullivan

(57) ABSTRACT

Methods for making golf balls and golf ball components using three-dimensional (3D) additive manufacturing systems are provided. The golf ball includes at least one three-dimensional piece. Preferably, a continuous liquid interface printing method is used to make the three-dimensional structure. Ultraviolet (UV)-light polymerizable materials are used in the method. The method may be used to make single-piece or multi-piece balls. For example, the ball may include an inner core produced by the liquid interface printing method. An outer core layer may be disposed about the inner core, and a cover comprising inner and outer cover layers may encapsulate the core assembly to form the finished golf ball. The outer core and cover layers may be made using conventional molding technologies or methods of this invention.

13 Claims, 7 Drawing Sheets

(56) References Cited

U.S. PATENT DOCUMENTS

| | | |
|---|---|---|
| 6,293,877 B1 | 9/2001 | Boehm |
| 6,398,667 B1 | 6/2002 | Lemons |
| 6,634,965 B2 | 10/2003 | Yagley et al. |
| 6,743,123 B2 | 6/2004 | Sullivan et al. |
| 6,773,364 B2 | 8/2004 | Sullivan et al. |
| 7,022,034 B2 | 4/2006 | Sullivan et al. |
| 7,211,007 B2 | 5/2007 | Sullivan et al. |
| 7,435,192 B2 | 10/2008 | Sullivan et al. |
| 7,901,301 B2 | 3/2011 | Morgan et al. |
| 8,033,933 B2 | 10/2011 | Sullivan et al. |
| 8,137,216 B2 | 3/2012 | Sullivan et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 2007/0287558 A1* | 12/2007 | Sullivan .............. A63B 37/0003 473/374 |
| 2011/0049738 A1 | 3/2011 | Sun et al. |
| 2014/0167300 A1 | 6/2014 | Lee |
| 2014/0361463 A1 | 12/2014 | DeSimone et al. |
| 2015/0072293 A1 | 3/2015 | DeSimone et al. |
| 2015/0182811 A1* | 7/2015 | Bender .................. B33Y 10/00 264/250 X |
| 2016/0046072 A1* | 2/2016 | Rolland .............. B29C 67/0066 264/401 |
| 2016/0114222 A1* | 4/2016 | Scolamiero ............ A63B 45/00 264/400 |
| 2016/0333152 A1* | 11/2016 | Cook ................ B29C 67/0055 |

\* cited by examiner

METHODS FOR MAKING GOLF BALL COMPONENTS USING THREE-DIMENSIONAL ADDITIVE MANUFACTURING SYSTEMS

BACKGROUND OF THE INVENTION

Field of the Invention

The present invention generally relates to methods for making golf balls and golf ball components using three-dimensional (3D) additive manufacturing systems. Preferably, a continuous liquid interface printing method is used to make the three-dimensional structure. More preferably, this method is used to make a three-dimensional inner core. An outer core made of rubber or other material may be disposed about the inner core. A single or multi-layered cover may encapsulate the core assembly to form the finished golf ball. The outer core and cover layers also may be made using methods of this invention. This invention further encompasses golf balls and golf ball components made by such methods.

Brief Review of the Related Art

Multi-piece, solid golf balls having a solid inner core protected by a cover are used today by recreational and professional golfers. The golf balls may have single-layered or multi-layered cores. Normally, the core layers are made of a highly resilient natural or synthetic rubber material such as styrene butadiene, polybutadiene, polyisoprene, or ethylene acid copolymer ionomers. The covers may be single or multi-layered and made of a durable material such as ethylene acid copolymer ionomers or polyurethanes. Also, there may be intermediate (casing) layers disposed between the core and cover. Manufacturers of golf balls use different ball constructions to impart specific properties and features to the balls.

The core is the primary source of resiliency for the golf ball and is often referred to as the "engine" of the ball. The resiliency or coefficient of restitution ("COR") of a golf ball (or golf ball component, particularly a core) means the ratio of a ball's rebound velocity to its initial incoming velocity when the ball is fired out of an air cannon into a rigid plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize the COR under these conditions. Balls (or cores) with a high rebound velocity have a relatively high COR value. Such golf balls rebound faster, retain more total energy when struck with a club, and have longer flight distances as opposed to balls with lower COR values. Ball resiliency and COR properties are particularly important for long distance shots. For example, balls having high resiliency and COR values tend to travel a far distance when struck by a driver club from a tee. The spin rate of the ball also is an important property. Balls having a relatively high spin rate are particularly desirable for relatively short distance shots made with irons and wedge clubs. Professional and highly skilled amateur golfers can place a back-spin on such balls more easily. By placing the right amount of spin and touch on the ball, the golfer has better control over shot accuracy and placement. This is particularly important for approach shots near the green and helps improve scoring.

Over the years, golf ball manufacturers have looked at adjusting the density or specific gravity among the multiple layers of the golf ball to control its spin rate. In general, the total weight of a golf ball needs to conform to weight limits set by the United States Golf Association ("USGA"). Although the total weight of the golf ball is mandated, the distribution of weight within the ball can vary. Redistributing the weight or mass of the golf ball either towards the center of the ball or towards the outer surface of the ball changes its flight and spin properties.

For example, the weight can be shifted towards the center of the ball to increase the spin rate of the ball as described in Yamada, U.S. Pat. No. 4,625,964. In the '964 patent, a polybutadiene rubber composition is used to form the core. According to the '964 patent, the inner core has a specific gravity of at least 1.50 in order to make the spin rate of the ball comparable to wound balls. The ball further includes a cover an intermediate layer disposed between the core and cover, wherein the intermediate layer has a lower specific gravity than the core. Chikaraishi et al., U.S. Pat. No. 5,048,838 discloses a three-piece golf ball containing a two-piece solid rubber core and a cover. The inner core has a diameter in the range of 15-25 mm, a weight of 2-14 grams, a specific gravity of 1.2 to 4.0, and a hardness of 55-80 JISC. The specific gravity of the outer core layer is less than the specific gravity of the inner core by 0.1 to 3.0.

In another example, the inner core structure has a non-uniform thickness and/or contains projecting members. These extending members on the outer surface of the core may be arranged in any suitable geometric pattern. For example, the extending members may be arranged in a grid or lattice; or a series of rows and raised columns. These extending members may be in the form of ridges, bumps, nubs, hooks, juts, ribs, segments, brambles, ribs, spines projections, points, protrusions, and the like. Suitable projecting members and various designs, patterns, and outlays of the members are disclosed in Sullivan et al., U.S. Pat. Nos. 8,137,216 and 8,033,933; Morgan et al., U.S. Pat. No. 7,901,301; Sullivan et al., U.S. Pat. Nos. 7,022,034 and 6,773,364; and Boehm, U.S. Pat. No. 6,293,877, It would be desirable to have new manufacturing methods for making three-dimensional components for golf balls such as, for example, cores, intermediate (casing) layers, and cover layers. In recent years, three-dimensional additive manufacturing systems have been used to make objects and parts in a wide variety of industries including, for example, apparel, footwear, automotive, aerospace, architecture, construction, packaging, military, jewelry, art, and dental and medical industries.

In general, additive manufacturing refers to systems that use three-dimensional (3D) digital data from an object to build-up the object by depositing metal, plastic, or other material layer-by-layer as opposed to subtractive systems used to build-up the object by removing material (for example, machining/milling an object from a solid block of polymer material). In these systems, computer software is used to collect digital data on the shape and appearance of a real object. A digital model is created and a series of digital cross-sectional slices of the model are taken.

For example, in a three-dimensional (3D) printing system, each slice is reconstructed by depositing a layer of the material and then solidifying it. The digital information is sent to the three-dimensional printer that successively adds thin layers of material (for example, a powder), until the object is produced. The layers are joined together in various ways, and different materials, for example, metal, plastic, ceramic, or glass). For example, in a three-dimensional (3D) printing process, an inkjet printer head can spray a thin layer of liquid plastic onto a build tray. The liquid layer is cured and it solidifies by irradiating it with ultraviolet (UV) light. The build tray is lowered by a layer, and the process is repeated until the model is completely built. In another 3D printing process, powder is used as the printing medium. The powder is spread as a thin layer on the build tray, and then it is solidified with a liquid binder. In Fusion Deposit Modeling (FDM), the nozzles trace the cross-section pattern for each particular layer. An extrusion head deposits a thin layer of the molten thermoplastic material onto a platform. The molten material hardens prior to application of the next layer. In Multi-Jet Modeling (MJM), a printing head that can move in multiple directions (x, y, and z coordinates) includes multiple small jets that apply the thermoplastic material to a platform layer-by-layer, and the material solidifies. In selective laser sintering (SLS), small powder particles are deposited in the desired pattern and then a laser is used to fuse the powder particles together. Other systems include laminate object manufacturing (LOM) and rapid prototyping. In stereolithography (SLA), liquid resin is applied to an elevator platform. The object is built layer-by-layer. For each layer, a laser beam traces a cross-section pattern of the object on the surface of the liquid resin. After the pattern has been traced, the elevator platform descends by the appropriate distance and the process is repeated. The platform is re-coated with liquid resin, and another pattern is traced. In this way, the layers are joined together and the object is built layer-by-layer. After the object is built, it is cleaned of any excess resin by immersing it in a chemical bath and the object is subsequently cured in an ultraviolet oven.

Although some three-dimensional (3D) printing systems may be somewhat effective in producing some 3D parts, there are some drawbacks with such systems. For example, 3D ink-jet printing systems build the part in discrete and separate layers. These ink-jet printed parts commonly exhibit orthotropic or anisotropic mechanical behavior depending on the orientation of the part during fabrication. Also, these 3D ink-jet printing systems can have relatively slow speeds and require support or base structures to build the part.

Thus, there is a need to new manufacturing methods for making golf balls and three-dimensional components for golf balls such as, for example, cores, intermediate (casing) layers, and cover layers. The new method should have a speed advantage over 3D ink-jet printing systems and be capable of producing high quality golf balls and components. The present invention provides such methods having these advantages as well as other benefits along with the resulting golf ball components and finished golf balls.

SUMMARY OF THE INVENTION

The present invention relates generally to methods for making golf balls having at least one three-dimensional piece and the resulting golf ball components and golf balls. The method generally comprises the steps of: a) providing a bath member having a bottom surface with an oxygen-permeable ultraviolet (UV)-light-transparent window and the bath contains a UV-light-polymerizable resin; b) projecting a sequence of UV-light images through the window according to digital information to form the piece on a support plate; and c) continuously elevating the support plate and drawing the piece out of the resin in the bath and curing the piece. During this step, a polymerization inhibition zone is created between the window and piece being elevated on the support plate as the images are projected through the window.

In one embodiment, the golf ball is a single three-dimensional piece ball. In another embodiment, the golf ball is a two-piece ball comprising a core and surrounding cover, wherein the three-dimensional piece is the core. In yet another embodiment, the golf ball is a three-piece ball comprising an inner core, outer core, and surrounding cover, wherein the three-dimensional piece is the inner core. The core can have a spherical or non-spherical shape. In one embodiment, the core is made of a foam composition or has a sponge-like interior. The core can comprise protruding members extending from its surface. The core can also have segments arranged in a lattice pattern on its surface. The surface of the core can have a uniform roughness to promote adhesion to subsequent layers applied over the core. These adjacent layers (for example, outer core or intermediate or cover layers) can be made using conventional molding/casting technologies or per the printing methods of this invention. In another example, the core may comprise a series of packed spheres in a buckyball-like configuration.

Different UV-light polymerizable materials may be used to make the three-dimensional pieces. For example, a resin comprising a photoinitiator and mixture of oligomers and monomers that have been functionalized by acrylate groups can be used. For example, the oligomers may be selected from the group consisting of acrylated polyethers, acrylated polyesters, and acrylated acrylics and mixtures thereof. Various thermoplastic or thermoset materials, fillers, and other additives may be added to the resin. The methods of this invention provide several advantages over conventional three-dimensional (3D) ink-jet printing systems including, but not limited to, faster manufacturing speeds, improved manufacturing feasibility, and high quality finished components and golf balls.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Golf balls having various constructions may be made in accordance with this invention. For example, golf balls having one-piece, two-piece, three-piece, four-piece, and five or more-piece constructions wherein the term "piece" refers to any core, intermediate (casing) layer, or cover, or other component of a golf ball construction. In the golf balls of the present invention, at least one piece is made using an additive manufacturing process as described further below.

For example, in one version, a one-piece ball, wherein the entire ball is made of one-piece, excluding any paint or coating and indicia applied thereon. In another example, a two-piece ball comprising a single core and a single cover layer can be made. In a third version, a three-piece golf ball containing a dual-layered core and single-layered cover can be made. The dual-core includes an inner core (center) and surrounding outer core layer. In another version, a three-piece ball containing a single core layer and two cover layers can be made. In yet another version, a four-piece golf ball containing a dual-core and dual-cover (inner cover and outer cover layers) can be made. In yet another construction, a four-piece golf ball containing a core; an inner cover layer, an intermediate cover layer, and an outer cover layer, may be made. In still another construction, a five-piece ball is made containing a dual-core, an inner cover layer, an intermediate cover layer, and an outer cover layer. The diameter and thickness of the different layers along with properties such as hardness and compression may vary depending upon the construction and desired playing performance properties of the golf ball. Representative illustrations of such golf ball constructions are provided and discussed further below.

Figure 1:
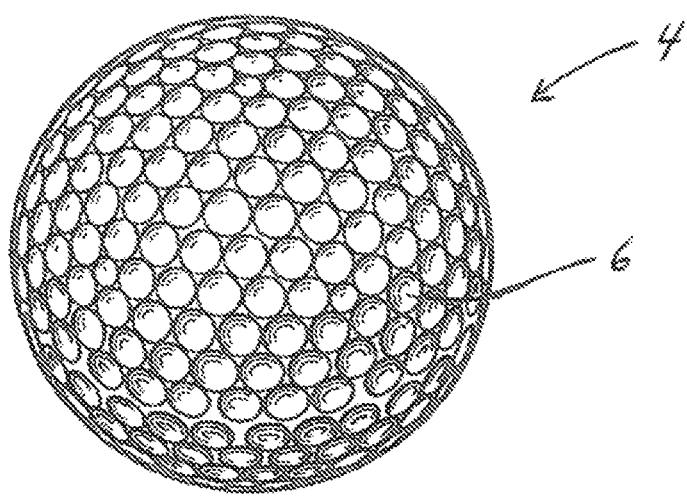
FIG. 1 is a perspective view of a one-piece golf ball having a dimpled cover according to the present invention.
Figure 2:
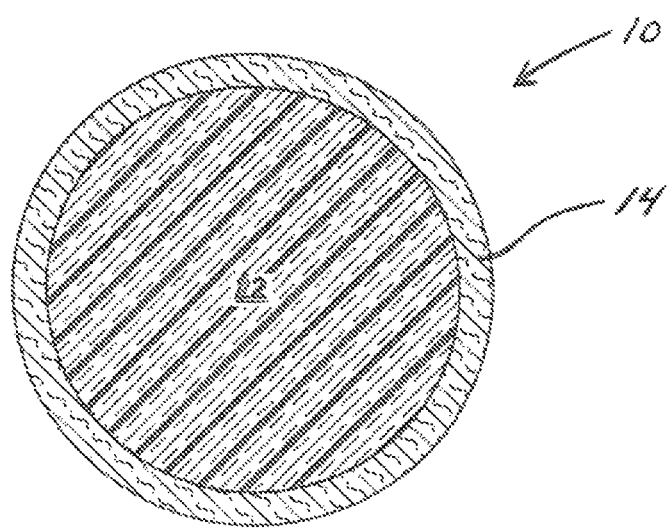
FIG. 2 is a cross-sectional view of a two-piece golf ball having a core and cover according to the present invention.
Figure 3:
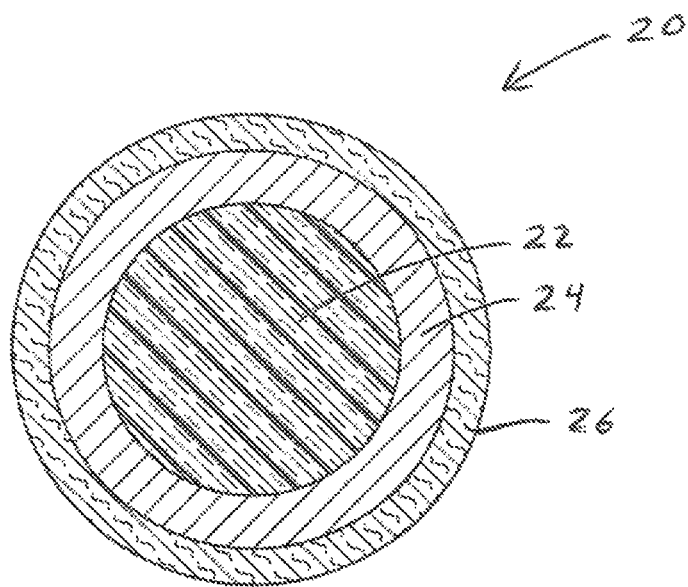
FIG. 3 is a cross-sectional view of a three-piece golf ball having a multi-layered core and single-layered cover according to the present invention.
Figure 4:
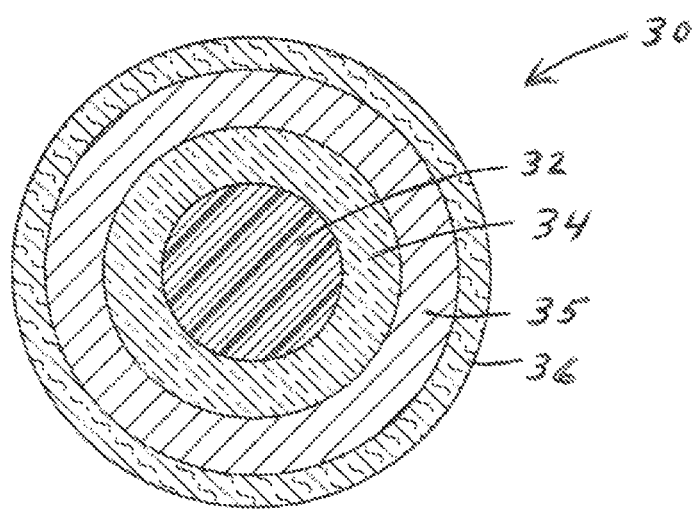
FIG. 4 is a cross-sectional view of a four-piece golf ball having a multi-layered core and dual-layered cover according to the present invention.

Referring to FIG. 1, one version of a golf ball that can be made in accordance with this invention is generally indicated at (2). The ball (2) is one-piece with a unitary structure. The outside surface of the ball contains dimples for improved aerodynamic performance. In FIG. 2, the two-piece ball (5) contains an inner core (3) and a cover (4). Turning to FIG. 3, the ball (6) contains a dual-core (8) having an inner core (center) (8a) and outer core layer (8b) surrounded by a single-layered cover (10). Referring to FIG. 4, in another version, the golf ball (12) contains a dual-core (14) having an inner core (center) (14a) and outer core layer (14b). The dual-core (14) is surrounded by a multi-layered cover (16) having an inner cover layer (16a) and outer cover layer (16b). In yet another version, as shown in FIG. 5, the golf ball (18) contains an inner core (center) (20a) and outer core layer (20b). The dual-core (20) is surrounded by a casing layer (22) and a multi-layered cover having an inner cover layer (24a) and outer cover layer (24b). The dual-core constructions (inner core and surrounding outer core layer) may be referred to as a ball sub-assembly.

In conventional golf ball manufacturing operations, the core has a spherical structure and is made using a compression molding process. The rubber composition contains a mixture of ingredients including free-radical initiator such as peroxides, cross-linking co-agents such as zinc diacrylate (ZDA), and additives. The ingredients are mixed on a mill to form slugs and then compression-molded to form solid spheres that will be used as the core. Heat and pressure are applied during the molding process. For example, a molding cycle at a temperature of 140 to 200° C. for a time 3 to 20 minutes can be used. Injection-molding processes also may be used. In contrast to such traditional molding methods, the present invention uses a three-dimensional additive manufacturing process to manufacture the core or other piece (component) of the golf ball.

Continuous Liquid Interface Printing

In this invention, a three-dimensional (3D) piece for a golf ball is made according to a continuous liquid interface printing method that includes the following steps. First, cross-sectional digital information for making the piece is sent to a light-processing digital imaging unit. The method uses a bath member (for example, basin) having a bottom surface with an oxygen-permeable, ultraviolet (UV) light-transparent window is used. The bath contains a UV-light polymerizable liquid resin. The digital imaging unit is used to project a continuous sequence of UV light images through the window of the bath according to the digital information. In this way, the digital information for making the three-dimensional object is illuminated and transmitted to the liquid resin. The illuminating UV light causes the liquid resin to solidify and form the three-dimensional piece on a support plate located above the bath. The construction of the piece is defined by the cross-sectional digital images. The three-dimensional piece grows on the support plate by continuously elevating the plate and drawing the object out of the resin bath while the imaging unit sends new UV images to the resin bath.

The method involves creating a "dead zone," (where polymerization is inhibited) between the oxygen-permeable, UV-light-transparent window and polymerizing 3D piece that is being elevated on the support plate. The oxygen-inhibiting dead zone, which contains a relatively thin layer of uncured resin, is created above the window and maintains a liquid interface between the window and bottom surface of the piece as it grows out of the resin bath. In the area above the dead zone, the polymerizing piece is continuously drawn out of the resin bath. The polymerizable liquid resin is constantly renewed and the cross-sectional UV images from the imaging unit are changed as the piece is drawn out by the support plate. During this light-curing step, the dead zone is maintained between the window and growing piece. Keeping the dead zone and liquid resin interface constant allows the printing process to be carried out continuously. In contrast to 3D ink-jet printing, where there are many separate and discrete steps needed to build-up the part layer-by-layer, this liquid interface printing process goes non-stop and does not build by layers. In this liquid interface process, the print speed is basically controlled by the polymerization rate and viscosity of the liquid resin. This dead zone, where photopolymerization is inhibited, is further discussed in the article, Tumbleston et al., "Continuous Liquid Interface Production Of 3D objects," *Science*, 20 Mar. 2015, Vol. 347, No. 6228, pp 1349-1352. www.sciencemag.org, published on-line, Mar. 16, 2015.

This continuous liquid interface printing process for making three-dimensional objects is generally described in the patent literature including, DeSimone et al., U.S. Pat. Nos. 9,216,546; 9,211,678; 9,205,601; and Published US Patent Applications 2015/0072293 and 2014/0361463, the disclosures of which are hereby incorporated by reference. Continuous liquid interface printing systems are available from Carbon 3D, Inc. (Redwood City, Calif.).

Continuous liquid interface printing systems are described in the patents and technical literature as having several advantages over 3D ink-jet printing technologies. For example, one benefit of the liquid interface printing systems over 3D ink-jet printing systems is that the liquid interface processes produce completely monolithic parts. In contrast, 3D ink-jet printing systems build the part in discrete and separate layers. The mechanical properties of the resulting liquid interface printed parts are isotropic unlike typical 3D ink-jet printed parts which commonly exhibit orthotropic or anisotropic mechanical behavior depending on the orientation of the part during fabrication. Also, the liquid interface printing methods have a significant speed advantage over other additive manufacturing methods, typically 25-100 times faster than other 3D printing technologies. Finally, the liquid interface printing method tends to eliminate the need for support or base structures common to other methods. The liquid interface printing method also improves surface finish and reduces post-fabrication steps.

Light-Polymerizable Materials

Suitable light polymerizable materials that can be used in accordance with this invention include oligomers, monomers, and mixtures thereof. Mixtures of different polymerizable materials having different polymerization rates, viscosities, and other properties can be added to the resin bath and the mixtures can be used to make the three-dimensional pieces of this invention. The olgiomers typically include epoxides, urethanes, polyethers, and polyesters. These oligomers are typically functionalized by an acrylate. The monomers used help control the cure speed, cross-link density, and viscosity of the resin along with other properties. These monomers include, for example, styrene, N-vinylpyrrolidone, and acrylates.

Anionic or cationic photoinitiators can be used to initiate polymerization when irradiated with light. These photoinitiators include styrenic compounds, vinyl ethers, N-vinyl carbazoles, lactones, lactams, cyclic ethers, cyclic acetals, and cyclic siloxanes.

In general, any suitable light-curable polymerizable material may be used in accordance with this invention. These include, but are not limited to, sol-gel, polyesters, vinyl ethers, acrylates, methacrylates, polyurethanes, polyureas, bio-absorbable resins, silicones, epoxides, cyanate esters, hydrogels, investment casting resins, polycarbonates, and thiol-enes. Typically, a mixture of light-curable oligomers and monomers are used in the light-curable polymerizable material.

For example, acrylated oligomers such as acrylated polyethers, acrylated polyesters, and acrylated acrylics may be used. Suitable acrylated oligomers that are commercially available include LAROMER PE 44F (acrylated polyester) and LAROMER 8981 (acrylated polyester) available from BASF Corp.; EBECRYL 588 (chlorinated acrylated polyester) available from UCB Chemicals Corp.; and CN 301 (polybutadiene dimethacrylate) and CN 302 (polybutadiene diacrylate) available from Sartomer. Preferably, the radiation-curable composition comprises an oligomer in an amount of at least about 60% based on weight of the formulation. In one embodiment, the coating comprises a radiation-curable oligomer selected from the group consisting of acrylated polyesters, polybutadiene dimethacrylate, and polybutadiene diacrylate.

Suitable radiation-curable monomers include multifunctional acrylates such as pentaerythritol triacrylate (PETA), trimethylolpropane triacrylate (TMPTA), 1,6 hexanediol diacrylate (HODA), tritripropylene glycol diacrylate (TRPGDA), and triethylene glycol diacrylate (TREGDA). Examples of monomers that are commercially available include TMPTA-N (trimethylolpropane triacrylate) and EB-40 (tetraacrylate monomer) available from UCB Chemicals Corp. Difunctional and monofunctional monomers also may be used. Examples of monofunctional monomers include 2-ethylhexyl acrylate, vinyl acetate, butyl acrylate, dimethylaminoethyl acrylate, isobutoxymethyl acrylamide, and dimethylacrylamide. Preferably, the radiation-curable composition comprises a monomer in an amount of about 20% based on weight of the formulation. In one embodiment, the radiation-curable monomer is trimethylolpropane triacrylate (TMPTA).

In the present invention, ultraviolet (UV) light radiation is preferably used to cure the composition, and the formulation preferably comprises a photoinitiator. In other instances, visible light radiation can be used to cure the composition. UV light radiation generally has a wavelength in the range of about 100 to about 400 nanometers (nm). Other light and energy curing sources, for example, visible light (wavelength of about 380 to 450 nm) and electron beam (low energy electrons) may be used. In UV light radiation, photoinitiators in the composition absorb the UV light and initiate free radical polymerization. Examples of suitable photoinitiators include Benzoin ethers (Norrish type I initiator) and Benzophenone (Norrish type II initiators that require amine coinitiators to be active). IGRACURE 184 (1-hydroxy-cyclohexyl phenyl ketone) and phenylbis (2,4, 6-trimethyl benzoyl)-phosphine oxide are available from Ciba Specialty Chemicals Corp., and ESACURE KTO-46 (blend of trimethylbenzophenone, polymeric hydroxy ketone, and trimethylbenzoyldiphenyl phosphine oxide) is available from Sartomer. Preferably, the radiation-curable coating comprises a photoinitiator in an amount of at least about 3% based on weight of the formulation. In one embodiment, the composition comprises a photoinitiator selected from the group consisting of 1-hydroxy-cyclohexyl phenyl ketone and a blend of trimethylbenzophenone, polymeric hydroxy ketone, and trimethylbenzoyldiphenyl phosphine oxide.

In addition, the radiation-curable coating may comprise additives such as, for example, inhibitors, surfactants, waxes, cure accelerators, defoaming agents, pigments, dispersing agents, optical brighteners, UV light stabilizers (blockers), UV absorbers, adhesion promoters, and the like. Inhibitors are used to retard or stop undesirable polymerization of the oligomers and monomers.

Three-Dimensional Pieces for Golf Ball

The methods of the present invention can be used to make the inner core as well as any other component for the golf ball including outer core and intermediate (casing) layers and covers. Although the three-dimensional pieces are described primarily herein as being inner cores, it is recognized that other three-dimensional pieces for the golf ball can be made. A three-dimensional piece made in accordance with this invention can have a have a spherical uniform structure. Alternatively, the three-dimensional piece can have a non-spherical, non-uniform structure and can be used as any component in the ball. Examples of such structures are described further below.

These structures include, for example, lattice or sponge like interiors including structures that have a high strength to weight ratio design; shell components of the golf ball; multi-layer constructions printed at the same time using two materials that are UV curable materials that react at different wavelengths; shells with micro-surfaces to promote adhesion; shells with micro-surfaces used as tie layers; shells with subsurface features used to precisely locate added mass, or highly damped materials; shells, lattices or geodesics with varying scale features to control weight distribution or flexural stiffness; unique solid or shell geometries created from 3D moebius or manifolds or fractrals or organic based structures; lattice or geodesic structures including undercuts; mating shells with Velcro™-like structures for holding layers together; lattice structures to be cast with urethane to create a double cover; lattice structures to be injection-molded to create a double cover; fabrication of monolithic printed parts that have no striations caused by 2D layering of material, and are manufactured to a precise tolerance (for example, <25 microns or <16 microns or <8 microns). The structures may have a wide variety of geometric shapes including, but, not limited to, spherical, circular, oval, triangular, square, pentagonal, hexagonal, heptagonal, octagonal, and the like.

As discussed above, golf balls having various constructions can be made in accordance with this invention. For example, golf balls having one-piece, two-piece, three-piece, four-piece, and five-piece constructions with single cores or multi-layered core sub-assemblies and intermediate (casing) layers and covers can be made.

In one embodiment, a ball sub-assembly comprising an inner core, outer core, and optional intermediate layer is made per the method described above, wherein ultraviolet (UV) light is projected through the window and into the polymerizable resin bath. The cross-sectional digital UV images are programmed for making the ball sub-assembly. The support plate moves upwardly to draw the sub-assembly out of the resin bath as the UV light images are projected through the window. After the first hemispherical-half (upper portion) of the ball sub-assembly has been formed and cured, the structure is flipped-over so that that the second hemispherical-half (lower portion) of the sub-assembly can be fabricated. The above-described continuous liquid interface curing process is repeated on the second hemispherical half of the structure to form a full spherical ball sub-assembly.

In a second embodiment, the intermediate layer is separately formed over the core sub-assembly using hemispherical half-shells. These smooth-surfaced hemispherical shells are made using the continuous liquid interface process as described above. The half-shells are then placed around the inner core structure in a compression mold. Under sufficient heating and pressure, the shells fuse together to form an intermediate layer that surrounds the core.

In another embodiment, a ball sub-assembly having an ultraviolet-light transparent intermediate layer disposed about the core is produced. In this version, the UV light can be transmitted through the transparent intermediate layer to cure the inner core. This curing step occurs as the support plate moves upwardly to draw the sub-assembly out of the resin in the bath.

In still another embodiment, a ball sub-assembly having an intermediate layer disposed about an inner core shell is produced. The core is subsequently filled with UV-light curable resin and plugged. The resin is then UV-light cured to form a ball sub-assembly having a solid core and intermediate layer disposed about the core.

In yet another embodiment, the core and one or more intermediate layers are formed simultaneously. Resins that are curable at different wavelengths are combined in the bath and multiple light sources are used to cure the associated resins such that the core and intermediate layer can be drawn from the bath in a single operation. Different UV-light sources can be placed in different positions above and below the resin bath.

Cover layers for the ball sub-assembly also can be made according to the present invention. Normally, the cover includes dimples to modify the aerodynamic properties of the ball. Different dimple shapes, sizes, and geometric patterns are used on the outer cover surface of the ball. For example, the dimples may be circular, oval, triangular, square, pentagonal, hexagonal, heptagonal, octagonal, and the like. The dimples also have different cross-sectional shapes. In one embodiment, the cover layers of this invention do not contain any spherically-shaped dimples. In another embodiment, the cover layer may include additional depressions such as depressions formed from imprinted symbols, logos, graphic designs, text, numbers, nameplates, or side stamps, and the like.

Core Structure—Geometric Projections and Thickness

Referring back to FIGS. 1-4, in some embodiments, the inner core has a substantially spherical shape and uniform thickness. In these embodiments, the inner core includes a geometric center and outer surface that are substantially free of any projections or extending members. That is, the inner core has a substantially uniform thickness and substantially smooth surface in these examples. Also, the core can have a foam or sponge-like composition. If needed, the outer surface of the core can have a uniform surface roughness to promote adhesion to other layers in the golf ball construction.

In other embodiments, the inner core structure is non-spherical and has a non-uniform thickness and/or contains projecting members. These extending members on the outer surface of the core may be arranged in any suitable geometric pattern. For example, the extending members may be arranged in a grid or lattice; or a series of rows and raised columns. These extending members may be in the form of ridges, bumps, nubs, hooks, juts, ribs, segments, brambles, ribs, spines projections, points, protrusions, and the like. The projections on the outer surface may have any suitable shape and dimensions, and they may be arranged randomly or in a geometric order. For example, the projections may have a circular, oval, triangular, square, rectangular, pentagonal, hexagonal, heptagonal, or octagonal. Conical-shaped projections also may be used. The projections may be arranged in linear or non-linear patterns such as arcs and curves. The projections may be configured so there are gaps or channels located between them. The outer surface of inner core also may contain depressions, cavities, and the like. These recessed areas can be arranged so the outer surface has a series of peaks and valleys. In yet other embodiments, the core can include a series of packed spheres, for example, the core can have a buckyball-like construction.

Suitable projecting members and various designs, patterns, and outlays of the members including three-dimensional geometric patterns for the inner and outer cores, intermediate layers, and covers are disclosed in Sullivan et al., U.S. Pat. Nos. 8,137,216; 8,033,933; and U.S. Pat. No. 7,435,192; Morgan et al., U.S. Pat. No. 7,901,301; Sullivan et al., U.S. Pat. Nos. 7,211,007; 7,022,034; 6,929,567; 6,773,364; and U.S. Pat. Nos. 6,743,123, and 6,595,874; and Boehm, U.S. Pat. No. 6,293,877, the disclosures of which are hereby incorporated by reference. Lattice structures, which can surround the core and which contain openings so that portions of the core are exposed, as disclosed in Lemons, U.S. Pat. No. 6,398,667, the disclosure of which is hereby incorporated by reference, also can be made.

Figure 5A:
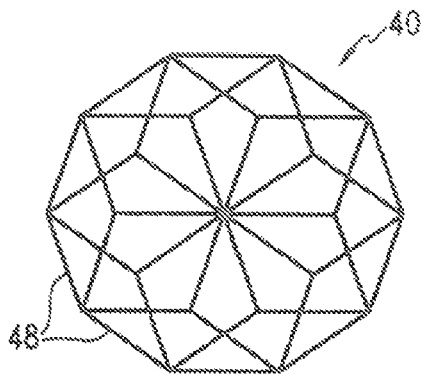
FIG. 5A is a front view of a core having a non-continuous layer with a geodesic pattern according to the present invention.
Figure 5B:
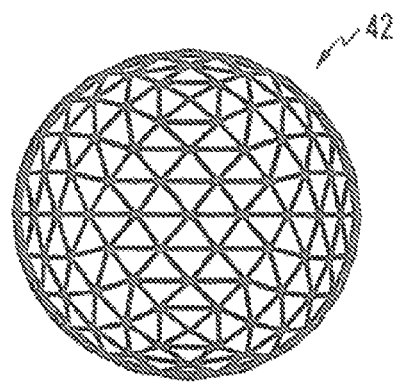
FIG. 5B is a front view of a core having a non-continuous layer with a pattern of multiple triangles according to the present invention.
Figure 5C:
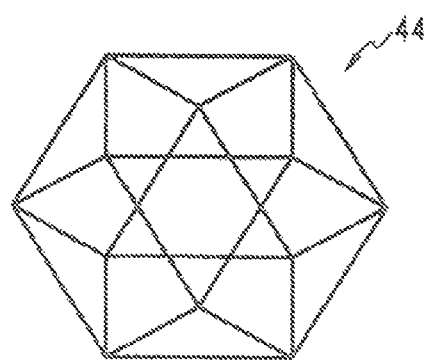
FIG. 5C is a front view of a core having a non-continuous layer with a pattern of multiple squares and equilateral triangles according to the present invention.
Figure 5D:
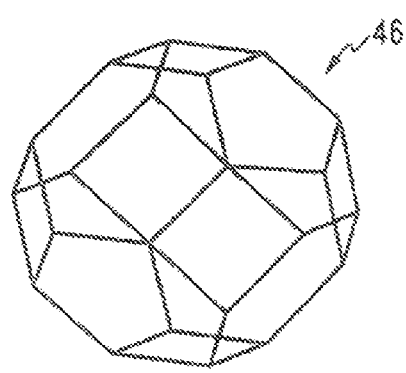
FIG. 5D is a front view of a core having a non-continuous layer with a pattern of multiple hexagons and squares according to the present invention.
Figure 6A:
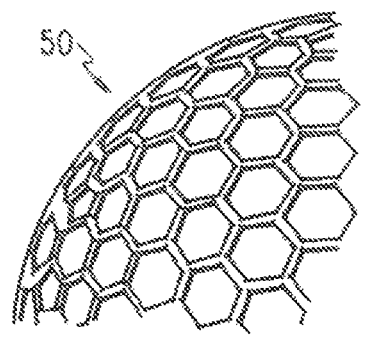
FIG. 6A is a front view of a core having a non-continuous layer with a perforated shell having hexagonal-shaped cells according to the present invention.
Figure 6B:
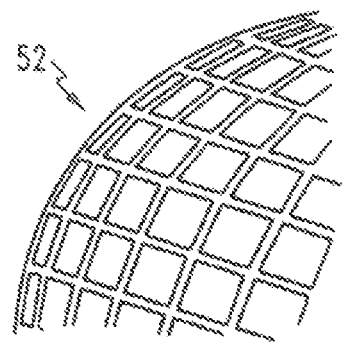
FIG. 6B is a front view of a core having a non-continuous layer with a perforated shell having square-shaped cells according to the present invention.
Figure 7:
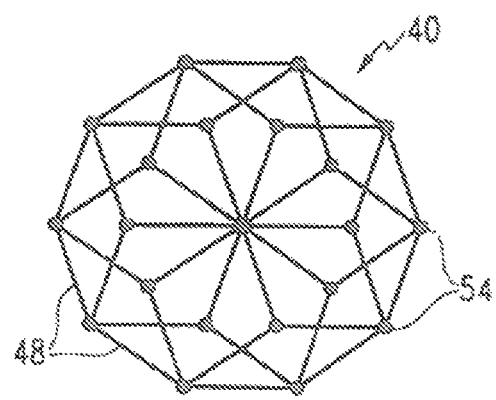
FIG. 7 is a front view of a core having a non-continuous layer with a perforated shell having segments and nodes according to the present invention.

More particularly, the inner core may have a non-continuous outer surface. For example, the surface may include a screen, lattice, scrim, geodesic pattern, or perforated spherical shell. The perforations may be round, oval, square, any curved figure or any polygon. The perforations may be arranged in a pattern or in random. The non-continuous layer may also be arranged in a random pattern, such as the patterns achieved by a non-woven or sputtering application. For example, FIG. 5A shows an exemplary wire-frame geodesic screen (40) comprising a plurality of diamonds. Examples of other suitable screens include screen (42), which comprises a plurality of triangles as shown in FIG. 5B, screen (44), which comprises a plurality of squares and equilateral triangles as shown in FIG. 5C, and screen (46), which comprises a plurality of hexagons and squares as shown in FIG. 5D. Examples of perforated spherical shells (50) and (52) are shown in FIGS. 6A and 6B. Screens (40), (42), (44), and (46) and perforated shells (50) and (52) are shown herein for illustration purpose only and the invention is not so limited. The weight of the screens is preferably carried by the segments (48) so that the weight is evenly distributed throughout the inner core. Alternatively, some of the weights can be allocated to nodes (54) of the screen as shown in FIG. 7.

Figure 8:
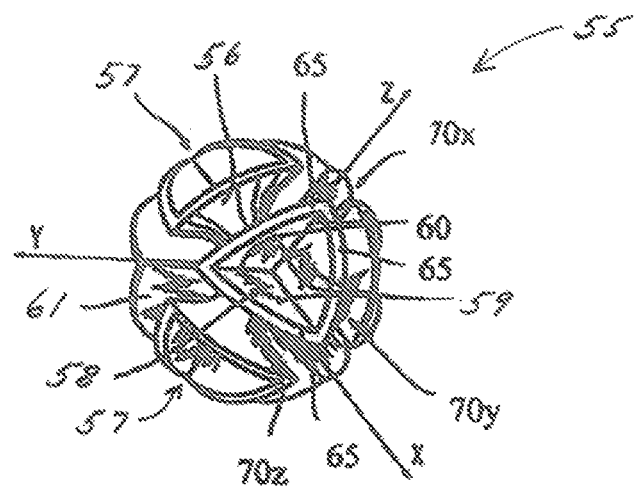
FIG. 8 is a perspective view of a core having a three-dimensional outer surface including projections and recesses according to the present invention.

Referring to FIG. 8, another embodiment of an inner core (55) that can be made in accordance with this invention is shown. The inner core (55) includes a three-dimensional outer surface (56) with projections (57) and each recess (58) is formed by three integral side walls (59). The projections (57) are spaced apart to define gaps (61) there between. Each of the side walls (59) is shaped like a flat quarter circle. The quarter circle includes two straight edges (60) joined by a curved edge (65). In each projection (57), each of the side walls (59) is joined at the straight edges (60). The curved edges (65) of each of the projections (57) allow the inner core to have a spherical outline. With reference to a three-dimensional Cartesian Coordinate system, there are perpendicular x, y, and z axii, respectively that form eight octants. There are eight projections (57) with one in each octant of the coordinate system, so that each of the projections (57) forms an octant of the skeletal sphere. Thus, the inner core is symmetrical. The gaps (61) define three perpendicular concentric rings ($70_x$, $70_y$, and $70_z$). The subscript for the reference number (70) designates the central axis of the ring about which the ring circumscribes.

Figure 9:
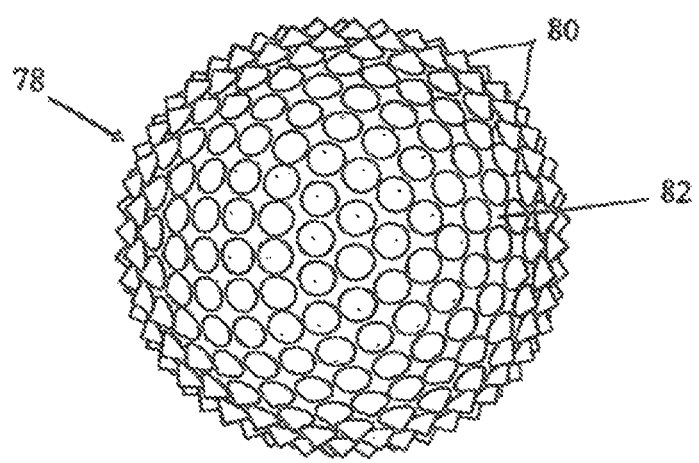
FIG. 9 is a perspective view of a spherical core having multiple projections extending radially outwardly from the surface of the core according to the present invention.

In FIG. 9, another embodiment of an inner core (78) is shown. The inner core (78) includes a spherical central portion and a plurality of projections (80) extending radially outwardly from the surface of central portion (82). The projections (80) include a base and a pointed free end. The projections (80) are preferably conical and taper from the base to the pointed free end. The projections (80) can have other shapes, such as polygons. Examples of polygonal shapes are triangles, pentagons, and hexagons.

Figure 10:
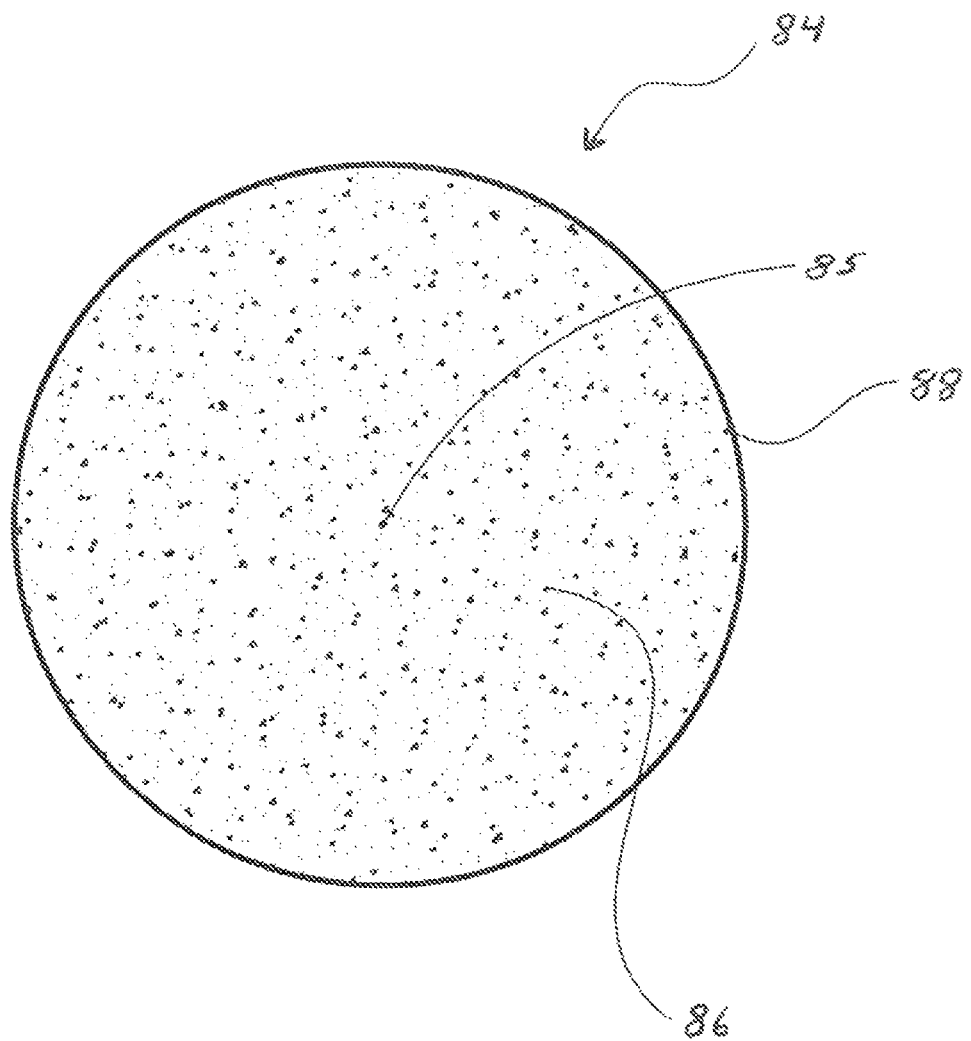
FIG. 10 is a cross-sectional view of a spherical inner core showing a foamed geometric center, outer region, and outer surface skin according to the present invention.

Inner cores having a foam or sponge-like interior also can be made. Turning to FIG. 10, an inner core having a cellular foam structure is shown. In general, foam compositions are made by forming gas bubbles in a polymer mixture using a foaming (blowing) agent. As the bubbles form, the mixture expands and forms a foam composition having either an open or closed cellular structure. Flexible foams generally have an open cell structure, where the cells walls are incomplete and contain small holes through which liquid and air can permeate. Rigid foams generally have a closed cell structure, where the cell walls are continuous and complete. Many foams contain both open and closed cells. In FIG. 10, a foamed inner core (84) having a geometric center (85), surrounding outer region (86), which contains a foam cellular network; and an outer skin surface (88), which is a generally dense layer and less foamed, is shown.

Figure 11:
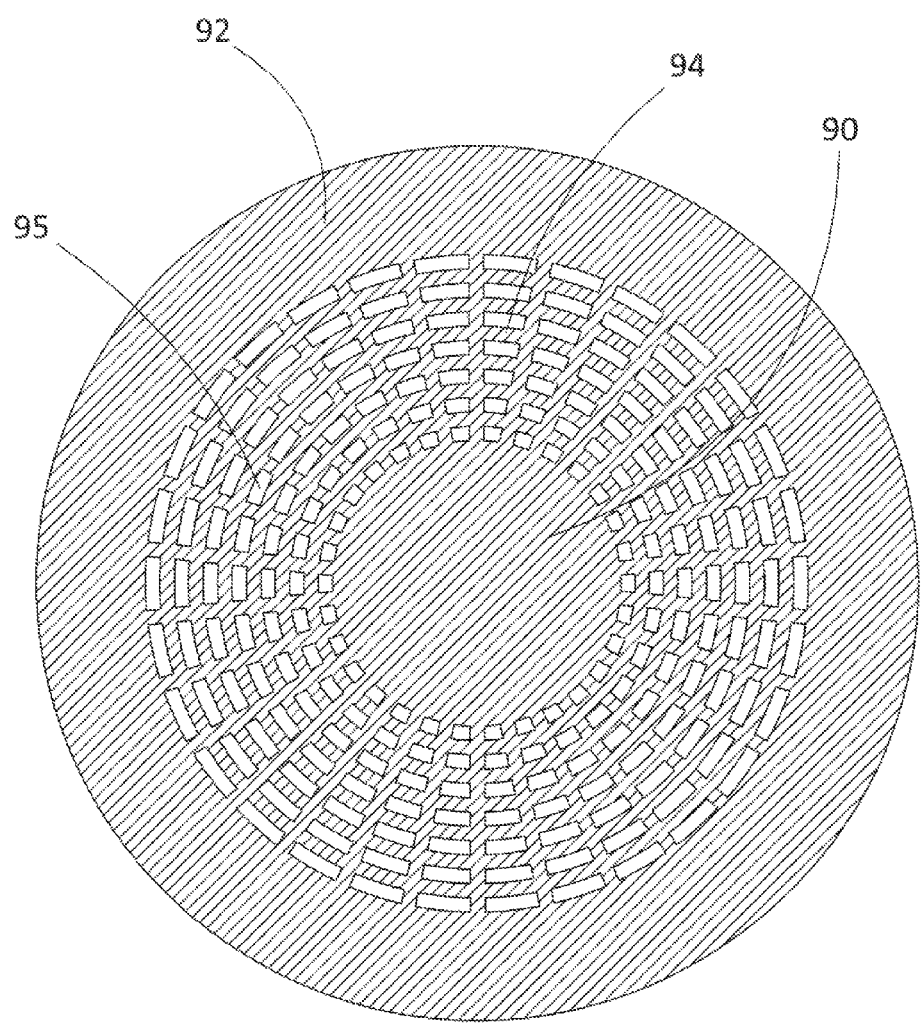
FIG. 11 is a cross-sectional view of an inner core having a lattice-like interior according to the present invention.

In yet another embodiment, as shown in FIG. 11, the inner core can include an interior portion (90) and an outer portion (92) connected via lattice-like structural members (94) as a single piece of the same material, such that the core contains air pockets (95) encased within the interior portion (90) of the core. The resulting lattice-like structure has a high strength to weight ratio.

Specific Gravity

In one embodiment, the overall specific gravity of the core structure (inner core and outer core layers) is preferably at least 1.8 g/cc, more preferably at least 2.00 g/cc, and most preferably at least 2.50 g/cc. In one embodiment, the inner core has a relatively low specific gravity. For example, the inner core may have a specific gravity within a range having a lower limit of about 0.80, 0.90 g/cc, 1.00 or 1.10 or 1.25 or 2.00 or 2.50 or 3.00 or 3.50 or 4.00, 4.25 or 5.00 and an upper limit of about 6.00 or 6.25 or 6.50 or 7.00 or 7.25 or 8.00 or 8.50 or 9.00 or 9.25 or 10.00 g/cc. In one preferred embodiment, the inner core has a specific gravity of about 0.80 to about 6.25 g/cc, more preferably about 1.00 to about 3.25 g/cc.

Meanwhile, in one preferred embodiment, the outer core layer has a relatively high specific gravity. Thus, the specific gravity of outer core layer ($SG_{outer}$) is preferably greater than the specific gravity of the inner core layer ($SG_{inner}$). For example, the outer core may have a lower limit of specific gravity of about 1.00 or 1.10 or 1.20 or 1.50 or 2.00 or 2.50 or 3.50 or 4.00 or 5.00 or 6.00 or 7.00 or 8.00 g/cc and an upper limit of about 9.00 or 9.50 or 10.00 or 10.50 or 11.00 or 12.00 or 13.00 or 14.00 or 15.00 or 16.00 or 17.00 or 18.00 or 19.00 or 19.50 or 20.00 g/cc. In one preferred embodiment, the $SG_{outer}$ is greater than the $SG_{inner}$ by at least 0.5 g/cc, more preferably 0.75 g/cc or greater, and even more preferably 1.00 g/cc or greater. In one embodiment, the difference between the $SG_{outer}$ and $SG_{inner}$ is within the range of about 0.5 g/cc to about 2.0 g/cc.

As discussed above, in one preferred embodiment, the specific gravity of the outer core layer ($SG_{outer}$) is greater than the specific gravity of the inner core layer ($SG_{inner}$). Alternatively, in another embodiment, the specific gravity of the inner core layer ($SG_{inner}$) is greater than the specific gravity of the outer core layer ($SG_{outer}$).

In general, the specific gravities of the respective pieces of an object affect the Moment of Inertia (MOI) of the object. The Moment of Inertia of a ball (or other object) about a given axis generally refers to how difficult it is to change the ball's angular motion about that axis. If the ball's mass is concentrated towards the center, less force is required to change its rotational rate, and the ball has a relatively low Moment of Inertia. In such balls, the center piece (that is, the inner core) has a higher specific gravity than the outer piece (that is, the outer core layer). In such balls, most of the mass is located close to the ball's axis of rotation and less force is needed to generate spin. Thus, the ball has a generally high spin rate as the ball leaves the club's face after making impact. Because of the high spin rate, amateur golfers may have a difficult time controlling the ball and hitting it in a relatively straight line. Such high-spin balls tend to have a side-spin so that when a golfer hook or slices the ball, it may drift off-course.

Conversely, if the ball's mass is concentrated towards the outer surface, more force is required to change its rotational rate, and the ball has a relatively high Moment of Inertia. In such balls, the center piece (that is, the inner core) has a lower specific gravity than the outer piece (that is, the outer core layer). That is, in such balls, most of the mass is located away from the ball's axis of rotation and more force is needed to generate spin. Thus, the ball has a generally low spin rate as the ball leaves the club's face after making impact. Because of the low spin rate, amateur golfers may have an easier time controlling the ball and hitting it in a relatively straight line. The ball tends to travel a greater distance which is particularly important for driver shots off the tee.

As described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference). In the present invention, the finished golf balls preferably have a Moment of Inertia in the range of about 55.0 g./cm$^2$ to about 95.0 g./cm$^2$, preferably about 62.0 g./cm$^2$ to about 92.0 g./cm$^2$ The term, "specific gravity" as used herein, has its ordinary and customary meaning, that is, the ratio of the density of a substance to the density of water at 4° C., and the density of water at this temperature is 1 g/cm$^3$.

In one embodiment, the golf balls of this invention tend to have a low Moment of Inertia (MOI) and are relatively high spin. The above-described core construction (wherein the inner core contains projecting members on its outer surface) and wherein the specific gravity of the inner core is greater than the specific gravity of the outer core ($SG_{center}>SG_{outer\ core}$) contributes to a ball having relatively high spin. Most of the ball's mass is located near the ball's center (axis of rotation) and this helps produce a higher spin rate. The cores and resulting balls also have relatively high resiliency so the ball will reach a relatively high velocity when struck by a golf club and travel a long distance.

In an alternative embodiment, the golf balls tend to have a high Moment of Inertia (MOI) and are relatively low spin. The core can have a structure such that most of the ball's mass is located near the ball's surface and this helps produce a lower spin rate. In such embodiments, the specific gravity of the inner core is preferably less than the specific gravity of the outer core ($SG_{center}<SG_{outer\ core}$).

The cores of this invention typically have a Coefficient of Restitution (COR) of about 0.75 or greater; and preferably about 0.80 or greater. The compression of the core preferably is about 50 to about 130 and more preferably in the range of about 70 to about 110. In other embodiments, cores having softer compressions (for example, less than 50) can be made.

Concerning the total weight and dimensions of the ball, the United States Golf Association (USGA) has established a maximum weight of 45.93 g (1.62 ounces) for golf balls. For play outside of USGA rules, the golf balls can be heavier. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of USGA rules, the golf balls can be of a smaller size. Normally, golf balls are manufactured in accordance with USGA requirements and have a diameter in the range of about 1.68 to about 1.80 inches. As discussed further below, the golf ball contains a cover which may be multi-layered and in addition may contain intermediate (casing) layers, and the thickness levels of these layers also must be considered. Thus, in general, the inner core preferably has a diameter within a range of about 0.100 to about 1.200 inches, and the dual-layered core sub-assembly (inner core and surrounding outer core layer) normally has an overall diameter within a range of about 1.00 to about 1.66 inches. For example, the inner core may have a diameter within a range of about 0.500 to about 1.000 inches. In another example, the inner core may have a diameter within a range of about 0.650 to about 0.850 inches. In yet another example, a very small inner core (for example, a core having a diameter of about 0.250 inches) may be made. The method of this invention is particularly effective in making very small inner cores. In one embodiment, the diameter of the core sub-assembly is in the range of about 1.15 to about 1.65 inches.

Flex Modulus

In one embodiment, the composition of this invention is relatively stiff and it has a high flex modulus. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures. In another embodiment, the composition of this invention is relatively flexible and it has a low flex modulus. More particularly, in one embodiment, the rubber composition has a flex modulus lower limit of less than 10,000, 10,000, 20,000 or 30,000 or 40,000 or 50,000 or 60,000 or 70,000 or 80,000 or 90,000 or 100,000; and a flex modulus upper limit of 110,000 or 120,000 or 130,000 psi or 140,000 or 160,000 or 180,000 or 200,000 or 300,000 or 400,000 or 500,000 psi or greater. In general, the properties of flex modulus and hardness are related, whereby flex modulus measures the material's resistance to bending and hardness measures the material's resistance to indentation. In general, as the flex modulus of the material increases, the hardness of the material also increases.

Outer Core Structure

As discussed above, the inner core can have various structures and it can be made of light-curable polymerizable materials using the above-described manufacturing methods. The outer core, which surrounds the inner core, also can be made of such light-curable polymerizable materials and have various three-dimensional structures using the above-described manufacturing methods. In other embodiments, the inner and/or outer core can be made of thermoset materials, for example, rubbers; or thermoplastic materials, for example, ethylene acid copolymer ionomers using conventional molding or other manufacturing methods.

Suitable thermoset rubber materials that may be used to form the outer core layer include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. Preferably, the outer core layer is formed from a polybutadiene rubber composition.

The thermoset rubber composition may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber composition also may include filler(s) such as materials selected from carbon black, clay and nanoclay particles as discussed above, talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In addition, the rubber compositions may include antioxidants. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.) Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art may be added to the rubber composition.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio.

As discussed above, in one preferred embodiment, a thermoset rubber composition is used to form the outer core. In alternative embodiments, the outer core layer is made from a thermoplastic material, for example, an ionomer composition.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized.

Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As discussed above, for HNP compositions, the acid groups are neutralized to 70% or greater, preferably 70 to 100%, more preferably 90 to 100%. In one embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In other embodiments, partially-neutralized compositions are prepared, wherein 10% or greater, normally 30% or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10% of the acid groups and sodium is added to neutralize an additional 90% of the acid groups.

Ionic plasticizers such as organic acids or salts of organic acids, particularly fatty acids, may be added to the ionomer resin. Such ionic plasticizers are used to make conventional ionomer composition more processable as described in Rajagopalan et al., U.S. Pat. No. 6,756,436, the disclosure of which is hereby incorporated by reference. In the present invention such ionic plasticizers are optional. In one preferred embodiment, a thermoplastic ionomer composition is made by neutralizing about 70 wt % or more of the acid groups without the use of any ionic plasticizer. On the other hand, in some instances, it may be desirable to add a small amount of ionic plasticizer, provided that it does not adversely affect the heat-resistance properties of the composition. For example, the ionic plasticizer may be added in an amount of about 10 to about 50 weight percent (wt. %) of the composition, more preferably 30 to 55 wt. %.

The organic acids may be aliphatic, mono- or multi-functional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

Cover Structure

The golf ball sub-assemblies of this invention may be enclosed with one or more cover layers. The golf ball sub-assembly may comprise the multi-layered core structure as discussed above. In other versions, the golf ball sub-assembly includes the core structure and one or more intermediate (casing) layers disposed about the core. The cover, which surrounds the ball sub-assembly can be made of light-curable polymerizable materials using the above-described manufacturing methods. Alternatively, the cover can be made using conventional molding or casting processes. In one particularly preferred version, the golf ball includes a multi-layered cover comprising inner and outer cover layers.

In such embodiments, the inner cover layer may be formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

Other suitable thermoplastic polymers that may be used to form the inner and outer cover layers include, but are not limited to, the following polymers (including homopolymers, copolymers, and derivatives thereof): a) polyesters, b) polyamides, c) polyurethanes, polyureas, polyurethane-polyurea hybrids, d) fluoropolymers, e) polystyrenes, f) polyvinyl chlorides, g) polycarbonates, h) polyethers, i) polyimides, polyetherketones, polyamideimides; and j) blends of two or more of the foregoing.

The compositions used to make the intermediate (casing) and cover layers may contain a wide variety of fillers and additives to impart specific properties to the ball. These additives and fillers include, but are not limited to, metals, glass, ceramics, pigments, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The cover layers are formed over the core or ball subassembly (the core structure and any intermediate (casing) layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the ball subassembly in a compression mold. Under sufficient heating and pressure, the shells fuse together to form an inner cover layer that surrounds the subassembly. In another method, the ionomer composition is injection-molded directly onto the core using retractable pin injection molding. An outer cover layer comprising a polyurethane or polyurea composition may be formed by using a casting process.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Different ball constructions can be made using the different core constructions of this invention as shown in FIGS. 1-11 discussed above. Such golf ball designs include, for example, one-piece, two-piece, three-piece, four-piece, five-piece, and six-piece designs. It should be understood that the core constructions and golf balls shown in FIGS. 1-11 are for illustrative purposes only and are not meant to be restrictive. Other core constructions and golf balls can be made in accordance with this invention.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention. It is understood that the compositions, ball components, and finished golf balls described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A method for making a golf ball having at least one three-dimensional piece, wherein the golf bail comprises a core and surrounding cover, and the three-dimensional piece is the core, comprising the steps of:
    a) providing a bath member having a bottom surface with an oxygen-permeable ultraviolet light-transparent window, wherein the bath contains ultraviolet light-polymerizable resin for forming the core;
    b) projecting a sequence of ultraviolet light images through the window according to digital information to form the core on a support plate, the core having a spherical shape with a diameter in a range of about 0.650 to about 0.850 inches;
    c) continuously elevating the support plate and drawing the core out of the resin in the bath and curing the core, as a polymerization inhibition zone is created between the window and core being elevated on the support plate and as the images are projected through the window.

2. The method of claim 1, wherein the ultraviolet light-polymerizable resin comprises a photoinitiator and mixture of oligomers and monomers that have been functionalized by acrylate groups.

3. The method of claim 2, wherein the oligomers are selected from the group consisting of acrylated polyethers, acrylated polyesters, and acrylated acrylics and mixtures thereof.

4. The method of claim 2, wherein the polymerizable resin further comprises a thermoplastic polymer selected from the group consisting of ethylene acid copolymer ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

5. The method of claim 2, wherein the polymerizable resin further comprises a thermoset rubber material selected from the group consisting of polybutadiene ethylene-propylene rubber, ethylene propylene-diene rubber, polyisoprene, styrene-butadiene rubber, polyalkenamers, butyl rubber, halobutyl rubber, polystyrene elastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and mixtures thereof.

6. A method for making a golf ball having at least one three-dimensional piece, wherein the golf ball comprises a core and surrounding cover, and the three-dimensional piece is the core, comprising the steps of:
   a) providing a bath member having a bottom surface with an oxygen-permeable ultraviolet light-transparent window, wherein the bath contains ultraviolet light-polymerizable resin for forming the core;
   b) projecting a sequence of ultraviolet light images through the window according to digital information to form the core on a support plate, the core having a non-spherical shape;
   c) continuously elevating the support plate and drawing the core out of the resin in the bath and curing the core, as a polymerization inhibition zone is created between the window and core being elevated on the support plate and as the images are projected through the window.

7. The method of claim 6, wherein the non-spherical shape core has an outer surface containing projecting members.

8. The method of claim 6, wherein the non-spherical shaped core has an outer surface containing recessed cavities.

9. A method for making a golf ball having at least one three-dimensional piece, wherein the golf ball comprises a core and surrounding cover, and the three-dimensional piece is the core, comprising the steps of:
   a) providing a bath member having a bottom surface with an oxygen-permeable ultraviolet light-transparent window, wherein the bath contains ultraviolet light-polymerizable resin for forming the core;
   b) projecting a sequence of ultraviolet light images through the window according to digital information to form the core on a support plate, the core being a single-piece having an interior portion and outer portion, the inner and outer portions being connected by a lattice structural member such that the interior portion of the core contains air pockets;
   c) continuously elevating the support plate and drawing the core out of the resin in the bath and curing the core, as a polymerization inhibition zone is created between the window and core being elevated on the support plate and as the images are projected through the window.

10. The method of claim 9, wherein the ultraviolet light-polymerizable resin comprises a photoinitiator and mixture of oligomers and monomers that have been functionalized by acrylate groups.

11. The method of claim 10, wherein the oligomers are selected from the group consisting of acrylated polyethers, acrylated polyesters, and acrylated acrylics and mixtures thereof.

12. The method of claim 9, wherein the polymerizable resin further comprises a thermoplastic polymer selected from the group consisting of ethylene acid copolymer ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

13. The method of claim 9, wherein the polymerizable resin further comprises a thermoset rubber material selected from the group consisting of polybutadiene, ethylene-propylene rubber, ethylene-propylene-diene rubber, polyisoprene, styrene-butadiene rubber, polyalkenamers butyl rubber, halobutyl rubber, polystyrene elastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and mixtures thereof.

* * * * *